US006280862B1

(12) United States Patent
Inokuti

(10) Patent No.: US 6,280,862 B1
(45) Date of Patent: *Aug. 28, 2001

(54) ULTRA-LOW IRON LOSS GRAIN-ORIENTED SILICON STEEL SHEET

(75) Inventor: Yukio Inokuti, Chiba (JP)

(73) Assignee: Kawasaki Steel Corporation (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/194,229

(22) PCT Filed: Apr. 2, 1998

(86) PCT No.: PCT/JP98/01527

§ 371 Date: Nov. 23, 1998

§ 102(e) Date: Nov. 23, 1998

(87) PCT Pub. No.: WO98/44517

PCT Pub. Date: Oct. 8, 1998

(30) Foreign Application Priority Data

Apr. 3, 1997 (JP) ... 9-084838
Aug. 27, 1997 (JP) ... 9-231235

(51) Int. Cl.[7] ... B32B 18/00; H01F 1/04

(52) U.S. Cl. ... 428/698; 428/167; 428/469; 428/472; 428/337; 148/110; 148/113; 148/307

(58) Field of Search ... 428/469, 472, 428/698, 627, 167, 337; 148/113, 110, 122, 307, 308

(56) References Cited

U.S. PATENT DOCUMENTS

| | | | |
|---|---|---|---|
| 3,765,957 * | 10/1973 | Hamachi et al. | 148/113 |
| 3,985,583 * | 10/1976 | Shimanaka et al. | 148/6.16 |
| 4,238,534 * | 12/1980 | Ichida et al. | 427/376.5 |
| 4,698,272 * | 10/1987 | Inokuti et al. | 428/627 |
| 4,713,123 * | 12/1987 | Inokuti et al. | 148/113 |
| 4,952,253 * | 8/1990 | Nishiike et al. | 148/113 |
| 5,174,833 * | 12/1992 | Tanaka et al. | 148/113 |
| 5,223,048 * | 6/1993 | Inokuti et al. | 148/307 |

FOREIGN PATENT DOCUMENTS

| | | |
|---|---|---|
| 360103182A * | 6/1985 | (JP) . |
| 406017261A * | 1/1994 | (JP) . |
| 408157965A * | 6/1994 | (JP) . |

* cited by examiner

*Primary Examiner*—Deborah Jones
*Assistant Examiner*—Stephen Stein
(74) *Attorney, Agent, or Firm*—Schnader Harrison Segal & Lewis LLP

(57) ABSTRACT

Ultra-low iron grain-oriented silicon steel sheet which is made by forming a ceramic tensile coating including at least inner and outer portions of a nitride and/or a carbide, the outer portion having a coefficient of thermal expansion that is lower than that of the inner portion, and wherein the outermost portion has an insulating property.

18 Claims, 5 Drawing Sheets

ULTRA-LOW IRON LOSS GRAIN-ORIENTED SILICON STEEL SHEET

TECHNICAL FIELD

The present invention relates to an ultra-low iron loss grain-oriented silicon steel sheet which is suitable for use as an iron core material for electrical apparatuses such as transformers. In particular, the present invention aims at improving the iron loss property by forming a ceramic tensile coating on the smoothed surface of a finishing-annealed grain-oriented silicon steel sheet or the surface of a finishing-annealed grain-oriented silicon steel sheet having a linear groove region. The ceramic tensile coating is composed of a nitride and/or a carbide and has a coefficient of thermal expansion that becomes smaller toward the outer layer side.

BACKGROUND ART

In general, a grain-oriented silicon steel sheet is used as an iron core of electrical apparatuses such as transformers. The grain-oriented silicon steel sheet must have high magnetic flux density (represented by a value $B_8$) and low iron loss (represented by $W_{17/50}$) as magnetic properties.

In order to improve magnetic properties of the grain-oriented silicon steel, first, the <001> axis of secondary-recrystallized grains in the steel sheet must be highly oriented in the rolling direction. Secondly, impurities and precipitates that remain in the end product must be minimized.

Since the basic production technique of the grain-oriented silicon steel sheet by two-stepped cold rolling method was suggested by N. P. Goss, various improvements have been attempted. As a result, magnetic flux density and iron loss have been enhanced year by year.

Typical improvement techniques include a method disclosed in Japanese Patent Publication No. 51-13469 in which Sb, and MnSe or MnS are used as inhibitors, and methods disclosed in Japanese Patent Publication Nos. 33-4710, 40-15644, and 46-23820 in which AlN and MnS are used as inhibitors. By these methods, products with a high magnetic flux density $B_8$ of more than 1.88 T have become obtainable.

In order to obtain products with higher magnetic flux density, other methods have been disclosed, including, for example, Japanese Patent Publication No. 57-14737, in which Mo is added to a raw material, and Japanese Patent Publication No. 62-42968, in which, after Mo is added to a raw material, quenching is performed after intermediate annealing immediately before final cold rolling. By these methods, a high magnetic flux density $B_8$ of 1.90 T or more and a low iron loss $W_{17/50}$ of 1.05 W/kg or less (product sheet thickness: 0.30 mm) have been obtained. However, there is room for improvement with respect to further enhancement of low iron loss.

In particular, demands for absolute decrease in power loss have risen significantly since the recent energy crisis. Therefore, further improvement in iron core materials also has been desired, and products with a sheet thickness of 0.23 mm or less are now widely used.

In addition to the metallurgical methods described above, as disclosed in Japanese Patent Publication No. 57-2252, a method for reducing iron loss by artificially decreasing 180° magnetic domain width (magnetic domain refining technique) has been developed, in which the surface of a finishing-annealed steel sheet is irradiated with laser or is irradiated with plasma (B. Fukuda, K. Sato, T. Sugiyama, A. Honda, and Y. Ito: Proc. of ASM Con. of Hard and Soft Magnetic Materials, 8710–008, (USA), (1987)). By this technique, the iron loss in the grain-oriented silicon steel sheet has been greatly reduced.

Annealing at high temperatures, however, ruins the iron loss improvement effect caused by the magnetic domain refining technique using laser irradiation or the like. Accordingly, the usage of the product manufactured by this technique is limited to laminated iron-core transformers which generally do not require stress-relief annealing.

Therefore, as a magnetic domain refining technique having a sufficient iron loss improvement effect to withstand stress-relief annealing, a method has been industrialized, in which linear grooves are formed on the surface of a finishing-annealed grain-oriented silicon steel sheet and domain refining is performed using the demagnetizing field effect by the grooves (H. Kobayashi, E. Sasaki, M. Iwasaki, and N. Takahashi: Proc. SMM-8., (1987), P.402).

Apart from this, a method has been developed and industrialized (as disclosed in Japanese Patent Publication No. 8-6140), in which grooves are formed by localized electrolytic etching onto the final cold-rolled grain-oriented silicon steel sheet to refine magnetic domains.

Besides the grain-oriented silicon steel sheet, amorphous alloys, which are disclosed in Japanese Patent Publication No. 55-19976 and in Japanese Patent Laid-Open Nos. 56-127749 and 2-3213, have been noted as materials for general power transformers, high-frequency transformers, and the like.

Such amorphous materials have excellent iron loss in comparison with general grain-oriented silicon steel sheets. However, there are many disadvantages in practical use, such as, 1) lack of thermal stability, 2) poor lamination factor, 3) difficulty in cutting, and 4) high cost of fabrication of the transformers because of excessive thinness and brittleness. Accordingly, the amorphous materials have not been used in large quantity.

On the other hand, the present inventor has disclosed that ultra-low iron loss can be obtained by forming a tensile coating of at least one of either a nitride or a carbide of Si, Mn, Cr, Ni, Mo, W, V, Ti, Nb, Ta, Hf, Al, Cu, Zr, and B onto the grain-oriented silicon steel sheet, which has been smoothed by polishing, by means of dry plating, for example, CVD, ion plating, ion implanting, and sputtering, as disclosed in Japanese Patent Publication No. 63-54767 and so on. By the production method described above, grain-oriented silicon steel sheets having excellent iron loss are obtainable as materials for power transformers, high-frequency transformers, and the like. However, this does not sufficiently meet the recent demand for the enhancement of low iron loss.

The present invention advantageously satisfies the recent demand for the enhancement of low iron loss, and it is an object of the present invention to provide a grain-oriented silicon steel sheet which enables further reduction in iron loss in comparison with the conventional art.

DISCLOSURE OF INVENTION

The present inventor has made drastic reevaluations from every point of view in order to meet the recent demand for the enhancement of low iron loss.

That is, the present inventor was aware that drastic reevaluations were to be made with regard to everything from the components of a grain-oriented silicon steel sheet to the final treatment process in order to obtain products having ultra-low iron loss by forming a tensile coating of at least one of either a nitride or a carbide onto the smooth surface of the finishing-annealed grain-oriented silicon steel sheet in a stable process. The trace of the texture of the grain-oriented silicon steel sheet, the influence of the smoothness of the surface of the steel sheet, the influence of the final treatment such as CVD or PVD have been fully examined.

The following results (1) and (2) were obtained in the case of one-layer ceramic coating. A TiN coating was used as a typical example of the ceramic coating.

(1) Even if the ceramic coating is formed on the surface of the grain-oriented silicon steel sheet with a thickness of 1.5 μm or more, the iron loss is not greatly enhanced. That is, with respect to a TiN coating having a thickness of 1.5 μm or more, the deterioration of the lamination factor, the deterioration of the magnetic flux density, and the slight improvement of the iron loss only are expected.

(2) The tensile strength of the TiN coating (refer to Journal of the Japan Institute of Metals, 60 (1996), pp. 674–678, by Yukio Inokuti, Kazuhiro Suzuki, and Yasuhiro Kobayashi) was 8–10 MPa. With this tensile strength of the coating, an increase in magnetic flux density by $\Delta B_8$=0.014–0.016 T is expected. This corresponds to the average grain orientation integrated to the Goss orientation by approximately 1°. The large tensile strength of the TiN coating occurs because of good adhesion to the grain-oriented silicon steel sheet besides the tension-addition that is peculiar to ceramics. Good adhesion has been confirmed by the fact that the TiN-implanted layer on the steel sheet was observed as lateral stripes of 10 nm when the cross section of the TiN coating was scanned by a transmission electron microscope (refer to Journal of the Japan Institute of Metals, 60 (1996), pp. 781–786, by Yukio Inokuti). A layer having a thickness of 10 nm corresponds to 5 atomic layers with respect to the Fe-Fe atom in the [011] orientation of the grain-oriented silicon steel sheet. Also, in accordance with the simultaneous measurement of two layers in the TiN-coated region and the chemically polished region by X-rays (refer to ISIJ International, 36 (1996), pp. 347–352, by Y. Inokuti), in the (200) pole figure, the {200} peak shape of Fe in the polished region was circular, and the {200} peak shape of Fe in the TiN-coated region was elliptical. The observation results also prove that the grain-oriented silicon steel sheet is in a state in which the tension added is strong in the $[100]_{Si\text{-}steel}$ orientation in the grain-oriented silicon steel sheet.

Also, the following results (3) through (6) were obtained with respect to a one-layer ceramic coating and the surface states of a steel sheet.

(3) When grooves are formed by performing localized electrolytic etching onto the final cold-rolled grain-oriented silicon steel sheet, and the surface of the steel sheet after the secondary recrystallization treatment is smoothed by polishing, and then a TiN ceramic coating is formed, in addition to the magnetic domain refining by means of the demagnetizing field effect resulting from the grooves formed, the tension-addition by the ceramic coating effectively reduces iron loss.

(4) When concave grooves are formed onto the surface of the steel sheet before ceramic coating, the reduction effect of iron loss caused by the tension of the ceramic coating is greater in comparison with the steel sheet that is smoothed by general polishing (Japanese Patent Publication No. 3-32889. FIG. 1 is a graph showing the relationship described above. The solid line in FIG. 1 represents the influence of tensile strength over iron loss when grooves are formed. The dashed line in FIG. 1 represents the influence of tensile strength over iron loss when smoothing is performed by chemical polishing. In the case when the grooves are formed, the reduction of iron loss caused by tensile strength is greater in comparison with the case when smoothing is performed. The reason for this is that there is a tension difference between the groove sections and non-groove sections on the surface of the silicon steel sheet when grooves are formed.

(5) The reduction effect of iron loss increases when a ceramic coating is formed on the surface of a finishing-annealed grain-oriented silicon steel sheet having concave grooves in comparison with when a ceramic coating is formed on a silicon steel sheet smoothed by general polishing. FIG. 2 exhibits the state. FIG. 2(*a*) shows magnetic domains formed on the surface of a general grain-oriented silicon steel sheet. There is a relationship of 180° between the magnetization direction of the hatched section and the magnetization direction of the non-hatched section. FIG. 2(*b*) shows magnetic domains formed on the surface of a grain-oriented silicon steel sheet when linear grooves are formed on the silicon steel sheet. Numeral 20 represents a groove section, and numeral 22 represents a non-groove section. It is clear that magnetic domains are refined by the demagnetizing field effect by the grooves in comparison with FIG. 2(*a*). FIG. 2(*c*) shows magnetic domains formed on the surface of a grain-oriented silicon steel sheet when linear grooves are formed on the silicon steel sheet and further a ceramic coating is formed. It is clear that magnetic domains are further refined. The formation of the ceramic tensile coating in addition to the formation of grooves for refining magnetic domains is more effective, resulting in ultra-low iron loss.

(6) When grooves are formed by performing localized electrolytic etching onto the final cold-rolled grain-oriented silicon steel sheet, even if a TiN coating is formed onto the surface of the steel sheet that has been subjected to secondary recrystallization treatment without being smoothed by polishing, there is a considerable reduction of iron loss. That is, when smoothing treatment is not performed by polishing, for example, even when there is microscopic unevenness in the surface, by coating a ceramic film having a small coefficient of thermal expansion, strong tension can be added onto the surface of the silicon steel sheet, and thus iron loss can be advantageously reduced.

Based on the results (1) through (6), many experiments and examinations were performed by the present inventor in order to achieve the desired objects. Consequently, it was found that either in the silicon steel sheet having the smoothed surface or in the silicon steel sheet having linear grooves, by forming a ceramic tensile coating on the surface of the silicon steel sheet such that the coefficient of thermal expansion becomes smaller toward the outer layer, the desired objects are very effectively achieved. In particular, it has also been found that, desirably, a plurality of ceramic tensile coatings are used.

The present invention will be described in detail. First, ceramic films to be formed on the surface of the silicon steel sheet are described.

FIGS. 3(*a*), (*b*), and (*c*) are sectional views which schematically show respective surface areas of (a) a current grain-oriented silicon steel sheet, (b) a TiN-coated grain-oriented silicon steel sheet, and (c) an ultra-low iron loss grain-oriented silicon steel sheet in accordance with the present invention.

With respect to the current grain-oriented silicon steel sheet shown in FIG. 3(*a*), on steel 10 having a coefficient of thermal expansion of $13\times10^{-6}$/K, a forsterite underlying film 14 having a coefficient of thermal expansion of $11\times10^{-6}$/K is formed, and thereon, an insulating film 16 having a coefficient of thermal expansion of $5\times10^{-6}$/K is formed to reduce iron loss and to improve magnetostriction. A sulfide, oxide, or the like, 12, is formed at the interface between the steel and the forsterite underlying film. A lamination factor in this case is approximately 96.5%.

With respect to the TiN-coated grain-oriented silicon steel sheet shown in FIG. 3(*b*), on steel 10, a TiN thin film 15 having a thickness of approximately 1 $\mu$m is formed, and thereon, an insulating film 16 is formed. An interface 11 between the steel and the TiN film is smoothed. The TiN film has the coefficient of thermal expansion of $8\times10^{-6}$/K, which is smaller than a coefficient of thermal expansion, i.e., $11\times10^{-6}$/K, of the forsterite underlying film, and since stronger tension can be added onto the silicon steel sheet, further reduction of iron loss and improvement of magnetostriction can be achieved. A lamination factor in this case is approximately 97.5%, which is higher than the case of FIG. 3(*a*) by approximately 1%.

On the other hand, the ultra-low iron loss grain-oriented silicon steel sheet in accordance with the present invention is an ultra-low iron loss grain-oriented silicon steel sheet having a two-layered nitride-based ceramic thin coating, in which a TiN film 15 is formed thinly (0.01 to 0.5 $\mu$m) on the surface of steel 10, and thereon, an insulating $Si_3N_4$ film 18 having a significantly small coefficient of thermal expansion of $3\times10^{-6}$/K is formed with a thickness of 0.3 to 1.5 $\mu$m. An interface 11 between the steel and the TiN film is smoothed. A lamination factor in this case reaches approximately 99%, resulting in the ultimate silicon steel sheet.

FIG. 4 is a diagram showing the relationship between tensile strength and iron loss with respect to two types of grain-oriented silicon steel sheets having nitride-based ceramic thin coatings shown in FIGS. 3(*b*) and 3(*c*). The solid line relates to FIG. 3(*c*), and the dashed line relates to FIG. 3(*b*). As illustrated in FIG. 4, in the case when the TiN—$Si_3N_4$ two-layered nitride-based ceramic thin coating is formed in accordance with the present invention as shown in FIG. 3(*c*), there is notably a small change in iron loss caused by tension, in comparison with the case when the TiN film is simply formed on the grain-oriented silicon steel sheet as shown in FIG. 3(*b*). That is, in the case of FIG. 3(*c*), since more effective tension is added to the silicon steel sheet, ultra-low iron loss is achieved.

Next, the relationship between the surface state of the silicon steel sheet and the ceramic film will be described.

FIG. 5 is a diagram showing the relationship between tensile strength and iron loss with respect to the grain-oriented silicon steel sheets having different surface states.

The iron loss reduction curves (a) to (e) in FIG. 5 will be described as follows.

(a) An iron loss reduction curve (solid line) obtained when linear groove regions having a width of 200 $\mu$m and a depth of 20 $\mu$m and being spaced by 4 mm were formed substantially perpendicular to the rolling direction onto the surface of a final cold-rolled grain-oriented silicon steel sheet, finishing annealing was performed to develop secondary recrystallization in the (110) [001] orientation, and then tension was added onto the surface of the steel sheet after chemical polishing.

(b) An iron loss reduction curve (alternate long and short dash line) obtained when the surface of a finishing-annealed grain-oriented silicon steel sheet was smoothed by chemical polishing, linear groove regions having a width of 200 $\mu$m and a depth of 20 $\mu$m and being spaced by 4 mm were formed substantially perpendicular to the rolling direction, and then tension was added.

(c) An iron loss reduction curve (two-dot chain line) obtained when linear groove regions spaced by 4 mm were formed substantially perpendicular to the rolling direction by using a knife onto the surface of a final cold-rolled grain-oriented silicon steel sheet, finishing annealing was performed, and then tension was added after the surface of the steel sheet was chemically polished.

(d) An iron loss reduction curve (three-dot chain line) obtained when the surface of a finishing-annealed grain-oriented silicon steel sheet was smoothed by chemical polishing, linear groove regions spaced by 4 mm were formed substantially perpendicular to the rolling direction by using a knife, and then tension was added.

(e) An iron loss reduction curve (dotted line) obtained when the surface of a finishing-annealed grain-oriented silicon steel sheet was smoothed by chemical polishing, and then tension was added.

As illustrated in FIG. 5, among the iron loss reduction curves described above, the iron loss reduction of the silicon steel sheet by tensile strength is greatest under the conditions of (a) and (b), followed by the conditions of (c) and (d), and the conditions of (e).

Under the conditions of (a) and (b) in FIG. 5, as shown in FIG. 2, because of the tension difference around the surface of the steel sheet, the iron loss reduction presumably becomes greatest.

The process by which the present invention was successfully achieved and the content of the invention will be described in detail. First, specific test results regarding ceramic coatings will be described.

A continuously cast silicon steel slab composed of 0.072 wt% (hereinafter referred to as %) C, 3.44% Si, 0.085% Mn, 0.023% Se, 0.028% Sb, 0.025% Al, 0.0082% N, 0.013% Mo, and the rest substantially being Fe, was heat treated at 1,360° C. for 4 hours, and then was hot-rolled to produce a hot-rolled sheet having a thickness of 2.0 mm. Normalizing annealing was performed to the hot-rolled sheet at 980° C. for 3 minutes, and cold rolling was performed twice interposed with intermediate annealing at 960° C., to produce a final cold-rolled sheet having a thickness of 0.23 mm. Decarburization and primary recrystallization annealing were performed in an atmosphere of wet hydrogen at 840° C. to the cold-rolled sheet, and an annealing separator slurry having MgO as a major constituent was applied onto the surface of the annealed sheet. Next, secondary recrystallized grains highly integrated in the Goss orientation were developed on the steel sheet while raising the temperature from 850° C. to 1,050° C. at a rate of 8° C./h, and then purification treatment was performed in an atmosphere of dry hydrogen at 1,220° C. After removing the surface coating of the annealed sheet obtained as described above, the surface was smoothed by chemical polishing. Then, TiN was coated at a thickness of approximately 0.2 $\mu$m onto the surface of the silicon steel sheet (by ion plating in the HCD method), and thereon $Si_3N_4$ was coated at a thickness of 0.5 $\mu$m.

The measurement results of magnetic properties with respect to the grain-oriented silicon steel sheet described above are presented in Table 1.

For comparison, magnetic properties of 2) a silicon steel sheet coated with TiN and 3) a current silicon steel sheet, (both after refining magnetic domains), are also presented in Table 1.

As is clear from Table 1, the silicon steel sheet coated with TiN in 2) has a superior $W_{17/50}$ (W/kg) of 0.62 W/kg, in comparison with the current silicon steel sheet in 3) (comparative example) having $W_{17/50}$ (W/kg)=0.80 W/kg.

However, the silicon steel sheet provided with a two-layer (0.7 μm) ceramic coating of TiN and $Si_3N_4$ in accordance with the present invention has a significantly improved $W_{17/50}$ (W/kg) of 0.55 W/kg. Also, the lamination factor of 99.0% in 1) is significantly superior to that of 2) and 3).

As described above, the significant improvement in magnetic properties in accordance with the present invention is achieved by smoothing the surface of the grain-oriented silicon steel sheet having grown secondary recrystallization grains highly integrated in the Goss orientation, by facilitating the movement of domain walls, and by forming a two-layer (0.7 μm) ceramic coating of TiN and $Si_3N_4$ thereon.

Next, specific test results with respect to the surface state of silicon steel sheets will be described.

A continuously cast silicon steel slab composed of 0.074% C, 3.35% Si, 0.069% Mn, 0.021% Se, 0.025% Sb, 0.025% Al, 0.0072% N, 0.012% Mo, and the rest substantially being Fe, was heat treated at 1,350° C. for 4 hours, and then hot-rolled to produce a hot-rolled sheet having a thickness of 2.0 mm. Normalizing annealing was performed to the hot-rolled sheet at 970° C. for 3 minutes, and cold rolling was performed twice interposed with intermediate annealing at 1,050° C. to produce a final cold-rolled sheet having a thickness of 0.23 mm. Then, the final cold-rolled sheet was subjected to the following treatments.

1) After etching resist ink, which had an alkyd resin as a major constituent, was applied onto the surface of the final cold-rolled sheet by gravure offset lithography such that the non-applied sections remained linearly, with a width of 200 μm, spaced by 4 mm, baking was performed at 200° C. for 3 minutes. The resist thickness was 2 μm. By performing electrolytic etching onto the steel sheet applied with the etching resist, linear grooves having a width of 200 μm and a depth of 20 μm were formed, and the resist was removed by dipping in an organic solvent. The electrolytic etching was performed in a NaCl electrolytic solution with an electric current density of 10 $A/m^2$ and a treating time of 20 seconds.

2) For comparison, a final cold-rolled sheet to which the treatment described in 1) was not performed was prepared at the same time.

Next, both of the steel sheets were subjected to decarburization and primary recrystallization annealing in an atmosphere of wet hydrogen at 840° C., and an annealing separator slurry composed of MgO (25%), $Al_2O_3$ (70%), and $CaSiO_3$ (5%) was applied onto the surfaces of the steel sheets. After annealing at 850° C. for 15 hours, secondary recrystallized grains highly integrated in the Goss orientation were developed while raising the temperature to 1,150° C. at a rate of 10° C./h, and then purification treatment was performed in an atmosphere of dry hydrogen at 1,200° C.

After removing the surface coating of the annealed sheets, the surfaces of the silicon steel sheets were smoothed by chemical polishing. Then, TiN was coated at a thickness of approximately 0.2 μm onto the surfaces of the silicon steel sheets (by ion plating in the HCD method), and thereon $Si_3N_4$ was coated at a thickness of 0.5 μm.

The measurement results of magnetic properties with respect to the silicon steel sheets described above are presented in Table 2.

For comparison, magnetic properties of 3) a silicon steel sheet coated with TiN only are also presented in Table 2.

As is clear from Table 2, when linear grooves were formed on the steel surface and further a two-layered ceramic coating of TiN (0.2 μm)+$Si_3N_4$(0.5 μm) was formed thereon in accordance with 1), although the magnetic flux density decreased by 0.04 to 0.05 T in comparison with 2) and 3), the iron loss $W_{17/50}$ is notably reduced to 0.45 W/kg.

As described above, the significant improvement of magnetic properties in accordance with the present invention is achieved by forming concave linear grooves on the surface of the silicon steel sheet before coating ceramics, and refining magnetic domains by using the demagnetizing field effect, and then forming a two-layered ceramic coating of TiN+$Si_3N_4$(0.7 μm) to more effectively refine magnetic domains.

The ceramic coating to be formed onto the surface of the silicon steel sheet is at least one of a nitride or a carbide of Si, Mn, Cr, Ni, Mo, W, V, Ti, Nb, Ta, Hf, Al, Cu, Zr, and B, and what matters here is the following two points.

(1) A lower coefficient of thermal expansion is set toward the outer layer side.

(2) An outermost layer has an insulating property.

Also, the total thickness of the ceramic coating is preferably set at 0.3 to 2 μm. This is because if the thickness is less than 0.3 μm, the tensile effect will be small, and thus the improvement of the iron loss will be small, and if the thickness exceeds 2 μm, the lamination factor and the magnetic flux density will decrease.

As described above, the ultra-low iron loss grain-oriented silicon steel sheet in accordance with the present invention excels not only in the iron loss and the lamination factor, but also in magnetostriction, heat resistance, and insulation, in comparison with the conventional silicon steel sheet.

Any known composition is suitable for the silicon steel as a material in the present invention, the representative composition being as follows (all in weight %)

C: 0.01 to 0.08%

A C content of less than 0.01% inhibits hot rolled sheet texture formation insufficiently, and thus large elongation grains are formed, resulting in the deterioration of magnetic properties. On the other hand, the C content of more than 0.08% prolongs decarburization in the decarburization process, which is uneconomical. Therefore, a preferable range is approximately from 0.01 to 0.08%.

Si: 2.0 to 4.0%

If the Si content is less than 2.0%, sufficient electrical resistance cannot be obtained, and thus the eddy current loss increases, resulting in the deterioration in iron loss. On the other hand, if the Si content is more than 4.0%, brittle fractures are easily caused during cold rolling. Therefore, a preferable range is approximately from 2.0 to 4.0%.

Mn: 0.01 to 0.2%

Mn is an important constituent that determines MnS or MnSe as a dispersed precipitation phase which controls the secondary recrystallization of the grain-oriented silicon steel sheet. If the Mn content is less than 0.01%, the absolute quantity of MnS or the like required for causing the secondary recrystallizaion is insufficient, and thus incomplete secondary recrystallization occurs and the surface defects called blisters increase. On the other hand, if the Mn content exceeds 0.2%, even if MnS or the like is dissociated and solid soluted, for example, by heating the slab, the dispersed precipitation phase separated during hot rolling easily coarsens, and the optimum size distribution is impaired, resulting in the deterioration of magnetic properties. Therefore, Mn is preferably in a range from approximately 0.01 to 0.2%.

S: 0.008 to 0.1%, Se: 0.003 to 0.1%

Both the S content and Se content are preferably set at less than 0.1%. In particular, preferably, the S content ranges from 0.008 to 0.1%, or the Se content ranges from 0.003 to 0.1%. If these contents exceed 0.1%, the hot and cold workability deteriorates. On the other hand, if neither of them reaches the lower limit, the primary grain growth inhibition function of MnS or MnSe is not effective at all.

Besides, the addition of a known inhibitor such as Al, Sb, Cu, Sn or B will not prevent the effect of the present invention.

Next, the manufacturing process of the ultra-low iron loss grain-oriented silicon steel sheet in accordance with the present invention will be described.

First, in order to smelt a raw material, of course, a known furnace for steelmaking such as an LD converter, an electric furnace, an open-hearth furnace can be used, and in addition vacuum melting or RH degasification treatment may be used.

With respect to a method for adding a very small amount of inhibitor, such as S or Se for inhibiting the primary grain growth, into the molten steel, any known method may be used, and, for example, the addition may be made into the molten steel in an LD converter, after finishing RH degasification or during ingot-making.

Also, in order to produce slabs, although the use of a continuous casting process is advantageous because of economic and technical benefits such as cost reduction and lengthwise uniformity in component or quality, conventional ingot slabs may be used.

The continuously cast slab is heated at a temperature of 1,300° C. or more in order to dissociate and solid solute inhibitors in the slab. Then, the slab is subjected to rough hot rolling followed by finishing hot rolling to produce a hot-rolled sheet generally having a thickness of approximately 1.3 to 3.3 mm.

Next, the hot-rolled sheet is subjected to cold rolling twice, interposed with intermediate annealing at a temperature range from 850 to 1,100° C., to obtain a final thickness. In order to obtain a product having high magnetic flux density and low iron loss properties, an attention must be paid to a final cold rolling reduction (generally approximately 55 to 90%).

In order to minimize the eddy current loss of the silicon steel sheet, the upper limit of the thickness of a product is set at 0.5 mm, and in order to avoid harmful influence of the hysteresis loss, the lower limit of the sheet thickness is set at 0.05 mm.

When linear grooves are formed, it is particularly advantageous to form grooves on the steel sheet having the thickness of the product sheet after the final cold rolling.

That is, onto the surface of the final cold-rolled sheet or the steel sheet before or after the secondary recrystallization, linear groove regions having a width of 50 to 500 $\mu$m and a depth of 0.1 to 50 $\mu$m and being spaced by 2 to 10 mm are formed substantially perpendicular to the rolling direction.

The space between the linear groove regions is limited in a range from 2 to 10 mm, because, if it is less than 2 mm, excessive unevenness of the steel sheet decreases the magnetic flux density, which is uneconomical, and if it is more than 10 mm, the magnetic domain refining effect decreases.

If the width of the groove regions is less than 50 $\mu$m, there is a difficulty in using the demagnetizing field effect, and if the width exceeds 500 $\mu$m, the magnetic flux density decreases, which is uneconomical. Thus, the width of the groove sections is limited in a range from 50 to 500 $\mu$m.

Also, if the depth of the groove regions is less than 0.1 $\mu$m, the demagnetizing field effect cannot be effectively used, and if the depth exceeds 50 $\mu$m, the magnetic flux density decreases, which is uneconomical. Thus, the depth of the groove regions is limited in a range from 0.1 to 50 $\mu$m.

With respect to a method for forming the linear groove regions, a method which includes the steps of applying an etching resist onto the surface of the final cold-rolled sheet by printing, baking, performing etching treatment, and removing the resist is advantageous, in comparison with the conventional method which uses a cutting edge of a knife, a laser, or the like, because it can be performed stably from an industrial point of view, and iron loss can be more effectively reduced by tensile strength.

A typical example of the linear groove forming technique by etching described above will be described in detail.

Onto the surface of the final cold-rolled sheet etching resist ink, which had an alkyd resin as a major constituent, is applied by gravure offset lithography such that the non-applied sections remain linearly, with a width of 200 $\mu$m, spaced by 4 mm and substantially perpendicular to the rolling direction. Then, baking is performed at 200° C. for approximately 20 seconds. The resist thickness is set at approximately 2 $\mu$m. By performing electrolytic etching or chemical etching onto the steel sheet applied with the etching resist as described above, linear groves having a width of 200 $\mu$m and a depth of 20 $\mu$m are formed. The electrolytic etching may be performed in a NaCl electrolytic solution with an electric current density of 10 A/m$^2$ and a treating time of approximately 20 seconds. Also, the chemical etching may be performed in a $HNO_3$ solution with a dipping time of approximately 10 seconds. Next, the resist is removed by dipping in an organic solvent, and the steel sheet is subjected to decarburization annealing. The annealing is performed in order to transform the cold-rolled structure into the primary recrystallization structure and at the same time to eliminate C which is harmful when secondary recrystallization grains in the {110}<001> orientation are developed by final annealing (also referred to as finishing annealing). Generally, the annealing is performed in an atmosphere of wet hydrogen at 750 to 880° C.

The final annealing is performed in order to fully develop the secondary recrystallization grains in the {110}<001> orientation, and generally, the temperature is immediately raised and maintained to 1,000° C. or more by box annealing. The final annealing is performed while an annealing separator such as magnesia is applied, and an underlying film referred to as forsterite is formed at the same time. However, in accordance with the present invention, even if the forsterite underlying film is formed, the underlying film is removed in the next step, and thus, an annealing separator that does not form such a forsterite underlying film is advantageous. That is, an annealing separator, in which the content of MgO that forms a forsterite underlying film is reduced (50% or less), and instead, the content of $Al_2O_3$, $CaSiO_3$, or the like, that does not form such a film is increased (50% or more), is advantageous. In accordance with the present invention, in order to develop the secondary recrystallization structure that is highly integrated in the {110}<001> orientation, isothermal annealing at a low temperature of 820 to 900° C. is advantageous, and also, slow heating annealing at a heating rate of, for example, approximately 0.5 to 15° C./h may be performed.

After the final annealing, the forsterite underlying film or oxide film on the surface of the steel sheet are removed conventionally by a chemical process such as pickling, a mechanical process such as polishing, or a combination thereof, to smooth the surface of the steel sheet.

That is, after various coatings on the surface of the steel sheet are removed, the surface of the steel sheet is smoothed up to an arithmetical mean deviation of profile Ra of approximately 0.4 $\mu$m or less by conventional method such as chemical polishing, electrolytic polishing, mechanical polishing—for example, buffing, or a combination thereof.

When linear groove regions are formed on the surface of the silicon steel sheet, smoothing is not necessarily required for the surface of the steel sheet. Accordingly, in this case, without smoothing treatment that incurs an extra cost, pickling only can produce a sufficient iron loss reduction effect, which is advantageous. However, smoothing treatment is invariably advantageous.

Next, on the surface of the silicon steel sheet to which smoothing treatment has been performed, a ceramic tensile coating having at least two layers of tensile coating composed of at least one of a nitride or a carbide of Si, Mn, Cr, Ni, Mo, W, V, Ti, Nb, Ta, Hf, Al, Cu, Zr, and B is formed by various methods such as PVD, CVD, or sputtering.

As described above, attention must be paid to the following two points with respect to the formation of such a ceramic tensile coating.

(1) A lower coefficient of thermal expansion is set toward the outer layer side.

(2) An outermost layer has an insulating property.

The total thickness of the ceramic tensile coating is preferably set at approximately 0.3 to 2 $\mu$m, as described above.

With respect to the formation of the ceramic tensile coating described above, in FIG. 3(*c*), a ceramic tensile coating formed has two clearly separated layers, however, in accordance with the present invention, the boundary between the ceramic layers is not necessarily definite in such a manner, and the components of each layer may be diffused into the other layer. It is essential for the coating to have a coefficient of thermal expansion that becomes lower toward the outer layer side.

BEST MODE FOR CARRYING OUT THE INVENTION

Figure 1:
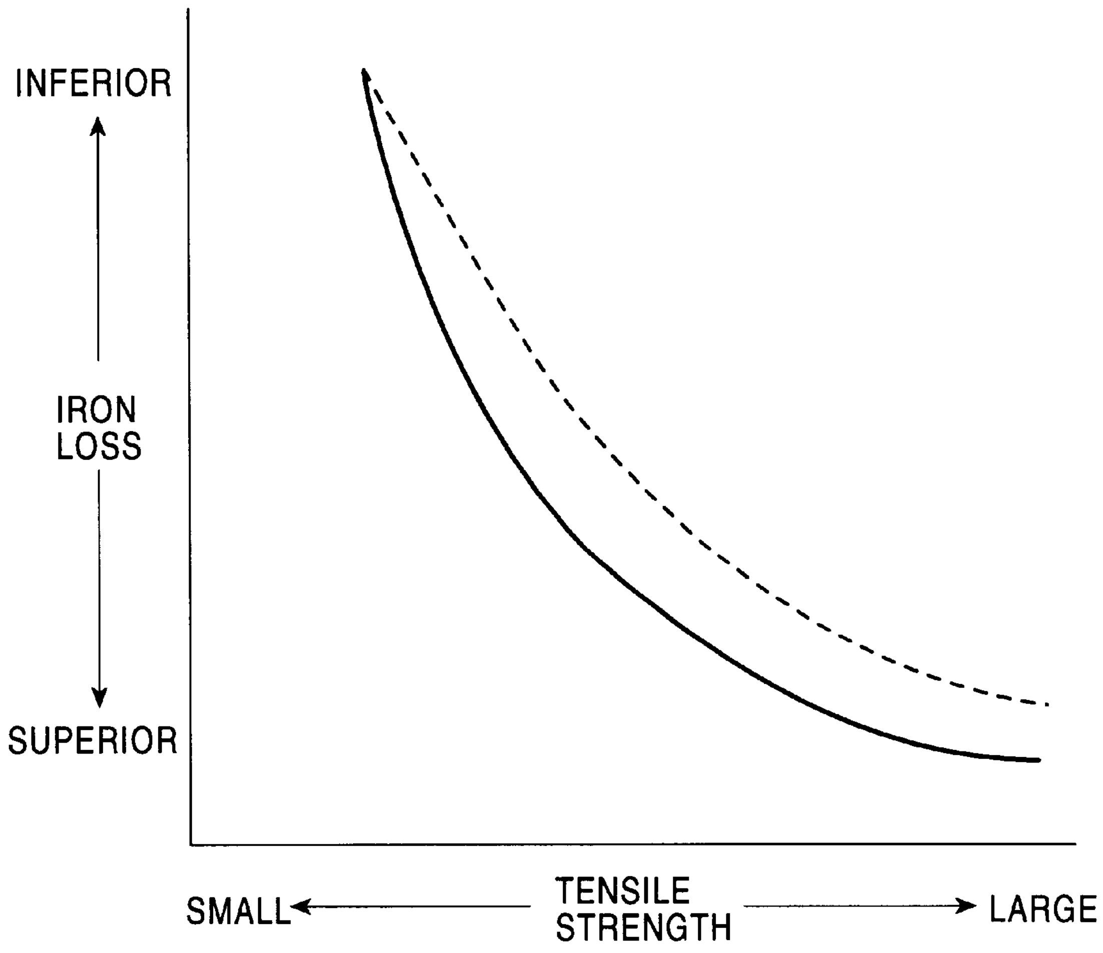
FIG. 1 is a graph showing the relationship between tensile strength and iron loss with respect to a grain-oriented silicon steel sheet to which chemical polishing treatment has been performed and another grain-oriented silicon steel sheet to which groove formation treatment has been performed.
Figure 2:
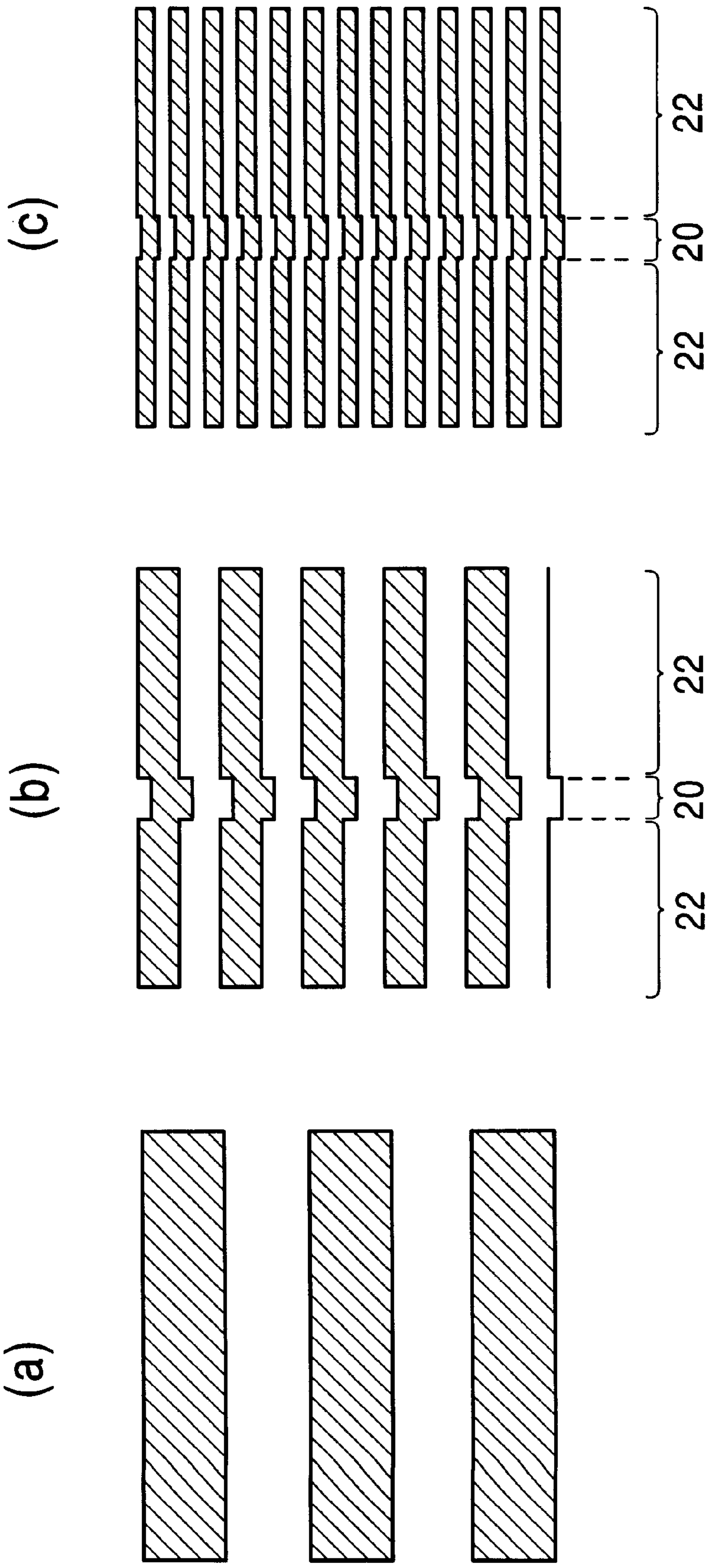
FIG. 2(*a*) is a diagram showing magnetic domains on the surface of a steel sheet having the secondary recrystallization structure in the Goss orientation, FIG. 2(*b*) is a diagram showing magnetic domains when linear grooves are formed on the surface of the steel sheet shown in FIG. 2(*a*), and FIG. 2(*c*) is a diagram showing magnetic domains when a ceramic coating is formed on the steel sheet shown in FIG. 2(*b*).
Figure 3:
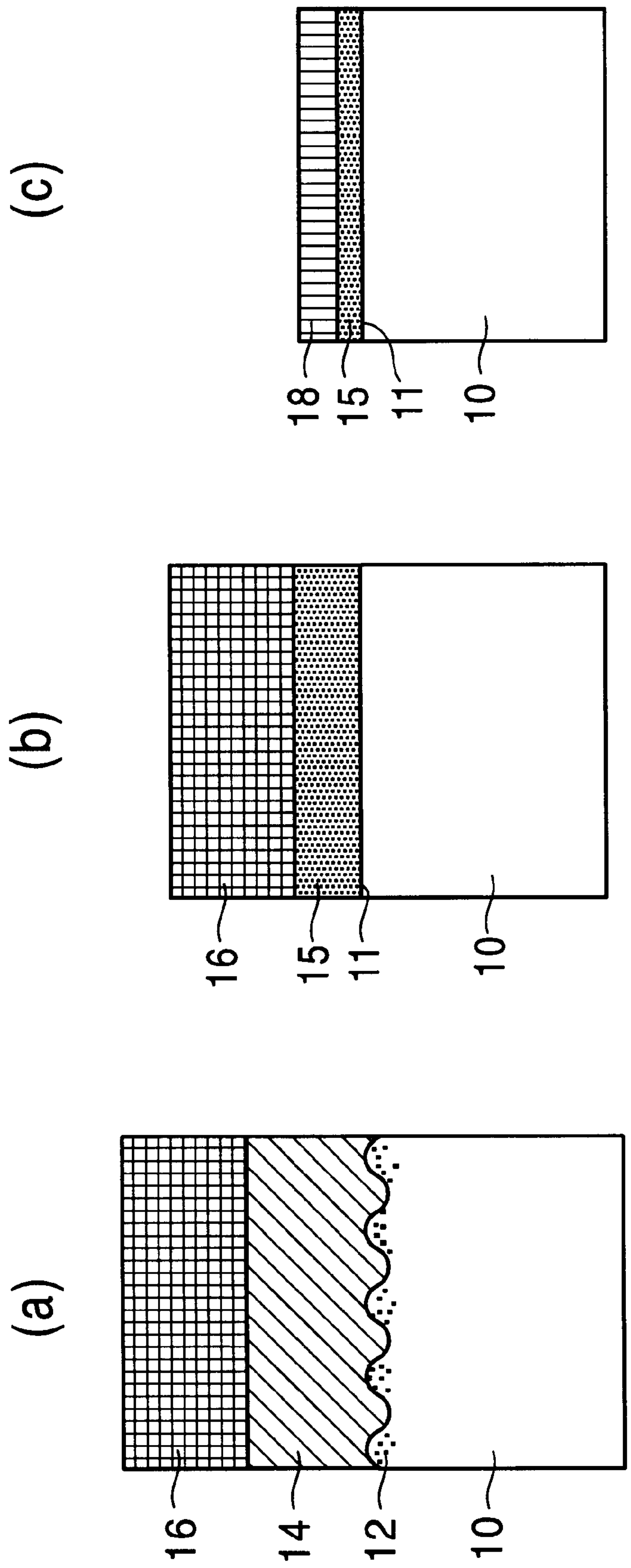
FIG. 3(*a*) is a sectional view which schematically shows the surface area of a current grain-oriented silicon steel sheet, FIG. 3(*b*) is a sectional view which schematically shows the surface area of a TiN-coated grain-oriented silicon steel sheet, and FIG. 3(*c*) is a sectional view which schematically shows the surface area of an ultra-low iron loss grain-oriented silicon steel sheet in accordance with the present invention.
Figure 4:
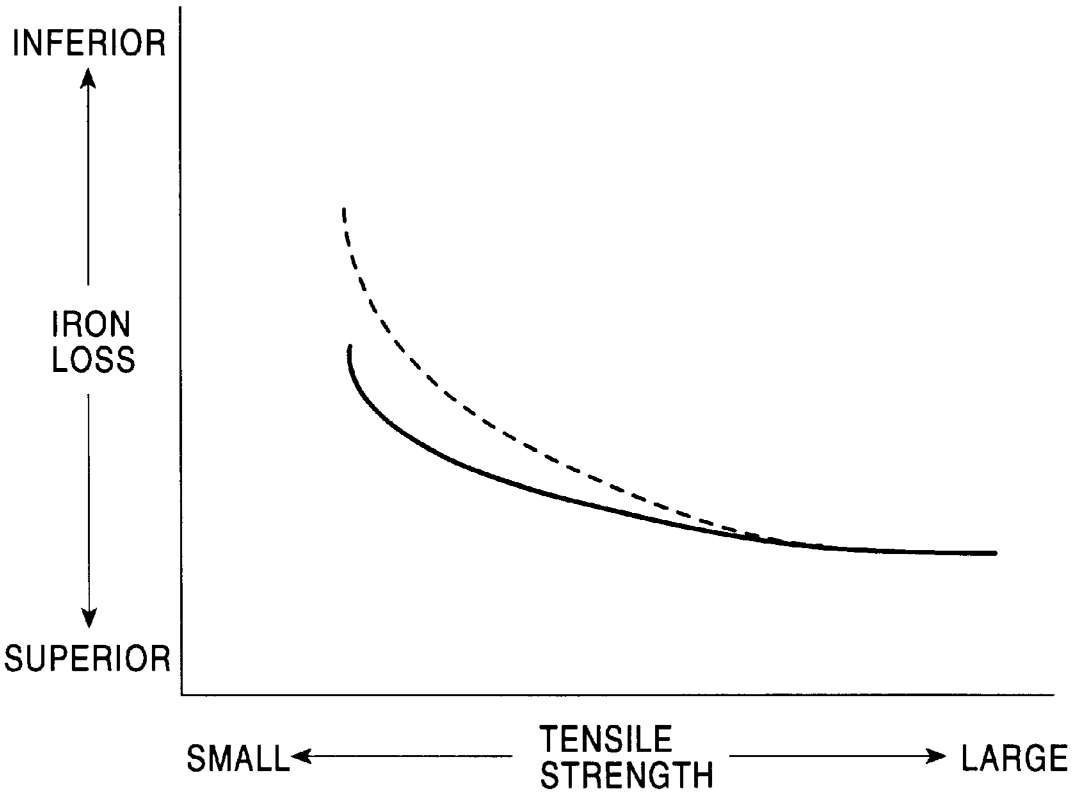
FIG. 4 is a graph showing the relationship between tensile strength and iron loss with respect to a grain-oriented silicon steel sheet in which a TiN coating only is formed on the surface of the steel sheet and a grain-oriented silicon steel sheet in which a TiN-$Si_3N_4$ two-layered nitride-based ceramic thin coating is formed in accordance with the present invention.
Figure 5:
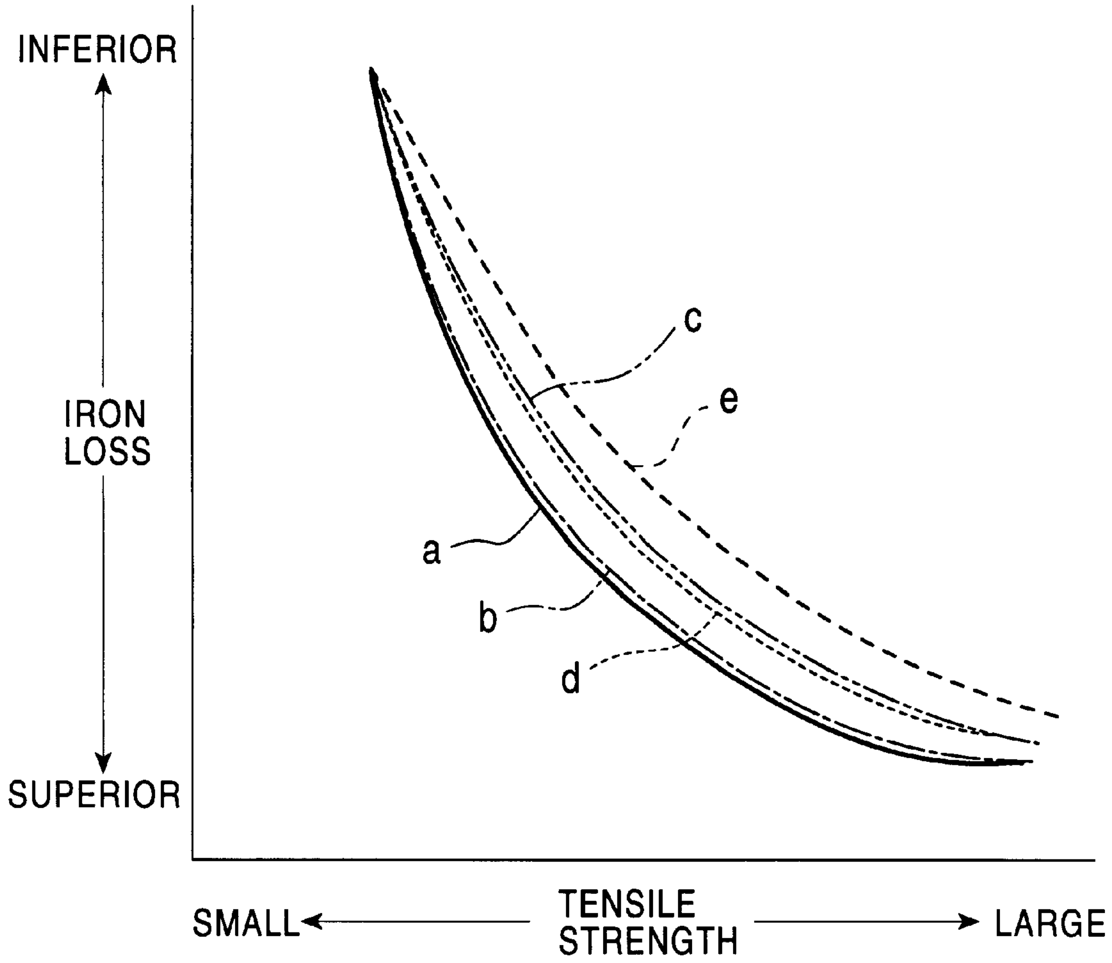
FIG. 5 is a graph showing the relationship between tensile strength and iron loss with respect to the silicon steel sheets having different surface states.

The present invention will be described more in detail based on examples. The present invention is not limited to these examples.

EXAMPLE 1

A continuously cast silicon steel slab composed of 0.073% C, 3.42% Si, 0.073% Mn, 0.021% Se, 0.026% Sb, 0.025% Al, 0.014% Mo, and the rest substantially being Fe, was heat treated at 1,3400° C. for 4 hours, and then was hot-rolled to produce a hot-rolled sheet having a thickness of 1.8 mm. After normalizing annealing was performed at 900° C., cold rolling was performed twice interposed with intermediate annealing at 950° C. to produce a final cold-rolled sheet having a thickness of 0.23 mm. With respect to rolling, warm rolling was performed at 350° C. Next, decarburization and primary recrystallization annealing were performed in an atmosphere of wet hydrogen at 820° C., and an MgO slurry was applied onto the surface of the steel sheet, and then secondary recrystallization annealing was performed at 850° C. for 50 hours followed by purification annealing in an atmosphere of dry hydrogen at 1,220° C. After smoothing the surface of the steel sheet by pickling and chemical polishing treatment, various two-layered ceramic coatings were formed by PVD and magnetron sputtering, and then magnetic domain refining treatment was performed.

The results of investigation about the magnetic properties of the products obtained as described above are presented in Table 3.

For comparison, the results of investigation about the magnetic properties with respect to a TiN-coated silicon steel sheet and a current silicon steel sheet, (both after refining magnetic domains), are also presented in Table 3.

As is clear from the table, any silicon steel sheet obtained in accordance with the present invention has superior iron loss value and lamination factor in comparison with the conventional material.

EXAMPLE 2

A continuously cast silicon steel slab composed of 0.074% C, 3.46% Si, 0.077% Mn, 0.025% sol.Al, 0.0074% N, 0.021% Se, 0.011% Mo, 0.21% Cu, 0.023% Sb, and the rest substantially being Fe, was subjected to repressing treatment by 40% at 1,260° C., and then was slowly heated up to 1,360° C. at a heating rate of 1.5° C./min, followed by soaking treatment for maintaining the temperature for 4 hours. Then, hot rolling was performed to produce a hot-rolled sheet having a thickness of 1.8 mm.

After normalizing annealing was performed at 1,050° C., cold rolling was performed twice interposed with intermediate annealing at 1,000° C. to produce a final cold-rolled sheet having a thickness of 0.23 mm. With respect to rolling, warm rolling was performed at 300° C. Next, decarburization and primary recrystallization annealing were performed in an atmosphere of wet hydrogen at 840° C., and an MgO slurry was applied onto the surface of the steel sheet, and then the temperature was raised from 850° C. to 1,080° C. at a heating rate of 12° C./h to perform secondary recrystallization, followed by purification annealing in an atmosphere of dry $H_2$ at 1,220° C.

After smoothing the surface of the steel sheet by pickling and chemical polishing treatment, two layers of TiN and $Si_3N_4$ were formed by magnetron sputtering, and then magnetic domain purification treatment was performed. As the result of measuring iron loss and lamination factor of the product, the following excellent property values were obtained.

$W_{17/50}$=0.53 W/kg

Lamination factor=99.1%

EXAMPLE 3

A continuously cast silicon steel slab composed of 0.069% C, 3.39% Si, 0.077% Mn, 0.022% Se, 0.025% Sb, 0.020% Al, 0.071% N, 0.012% Mo, and the rest substantially being Fe, was subjected to soaking treatment at 1,350° C. for 5 hours, and then hot rolling was performed to produce a hot-rolled sheet having a thickness of 2.1 mm. Next, normalizing annealing was performed at 950° C., cold rolling was performed twice interposed with intermediate annealing at 1,050° C. to produce a final cold-rolled sheet having a thickness of 0.23 mm. Then, the following three treatments were performed on the surface of the steel sheet.

(1) After etching resist ink, which had an alkyd resin as a major constituent, was applied onto the surface of the final cold-rolled sheet by gravure offset lithography such that the non-applied sections remain linearly with a width of 200 μm spaced by 4 mm substantially perpendicular to the rolling direction, baking was performed at 200° C. for approximately 20 seconds. The resist thickness was 2 μm. By performing electrolytic etching onto the steel sheet applied with the etching resist, linear grooves having a width of 200 μm and a depth of 20 μm were formed, and the resist was removed by dipping in an organic solvent. The electrolytic etching was performed in an NaCl electrolytic solution with an electric current density of 10 $A/m^2$ and a treating time of 20 seconds.

After performing decarburization and primary recrystallization annealing in an atmosphere of wet hydrogen at 840° C., an annealing separator slurry composed of MgO (25%), $Al_2O_3$ (70%), and $CaSiO_3$ (5%) was applied onto the surface of the steel sheet. After annealing at 850° C. for 15 hours, secondary recrystallized grains highly integrated in the Goss orientation were developed while raising the temperature to 1,150° C. at a rate of 10° C./h, and then purification treatment was performed at 1,200° C. in an atmosphere of dry hydrogen.

(2) The final cold-rolled sheet was subjected to decarburization and primary recrystallization annealing in an atmosphere of wet hydrogen at 840° C., and then linear grooves were formed in the same manner as that in (1) on the surface of the sheet to which decarburization and primary recrystallization annealing had been performed. An annealing separator slurry composed of MgO (25%), $Al_2O_3$ (70%), and $CaSiO_3$ (5%) was applied onto the surface of the steel sheet, and annealing was performed at 850° C. for 15 hours. After secondary recrystallized grains highly integrated in the Goss orientation were grown while raising the temperature to 1,150° C., purification treatment was performed in an atmosphere of dry hydrogen at 1,200° C.

(3) The final cold-rolled sheet was subjected to decarburization and primary recrystallization annealing in an atmosphere of wet hydrogen at 840° C., and then, with respect to the steel sheet in which secondary recrystallized grains in the (110)[001] orientation had been developed by the final annealing in the same manner as that in (2), an oxide film on the surface was removed, and then the surface was smoothed by chemical polishing. Linear grooves were formed in a same manner as that in (1) and (2).

Next, various two-layered ceramic coatings were formed on the surface of the steel sheet by PVD and magnetron sputtering.

The results of investigation about magnetic properties of the products obtained as described above are presented in Table 4.

For comparison, the results of investigation about magnetic properties of a TiN-coated silicon steel sheet and a current silicon steel sheet, (both after refining magnetic domains), are also presented in Table 4.

As is clear from the table, any silicon steel sheet obtained in accordance with the present invention has a superior iron loss property in comparison with the conventional material.

EXAMPLE 4

A continuously cast silicon steel slab composed of 0.043% C, 3.34% Si, 0.068% Mn, 0.020% Se, 0.025% Sb, 0.012% Mo, and the rest substantially being Fe, was heated at 1,330° C. for 3 hours, and then was hot-rolled to produce a hot-rolled sheet having a thickness of 2.4 mm.

After normalizing annealing was performed at 900° C., cold rolling was performed twice interposed with intermediate annealing at 950° C. to produce a final cold-rolled sheet having a thickness of 0.23 mm.

After etching resist ink, which had an alkyd resin as a major constituent, was applied onto the surface of the final cold-rolled sheet by gravure offset lithography such that the non-applied sections remain linearly with a width of 200 μm spaced by 4 mm substantially perpendicular to the rolling direction, baking was performed at 200° C. for approximately 20 seconds. The resist thickness was 2 μm. By performing electrolytic etching onto the steel sheet applied with the etching resist, linear grooves having a width of 200 μm and a depth of 20 μm were formed, and the resist was removed by dipping in an organic solvent. The electrolytic etching was performed in an NaCl electrolytic solution with an electric current density of 10 $A/m^2$ and a treating time of 20 seconds.

After performing decarburization and primary recrystallization annealing in an atmosphere of wet hydrogen at 840° C., an annealing separator slurry composed of MgO (25%), $Al_2O_3$ (70%), and $CaSiO_3$ (5%) was applied onto the surface of the steel sheet. After secondary recrystallized grains highly integrated in the (110)[001] orientation were developed by isothermal annealing at 850° C. for 50 hours, purification treatment was performed in an atmosphere of dry hydrogen at 1,200° C.

The oxide film on the surface of the silicon steel sheet obtained as described above was removed, and after smoothing the surface by chemical polishing, two layers of TiN $+Si_3N_4$ (0.7 μm) were formed by magnetron sputtering.

As the result of measuring iron loss and lamination factor of the product obtained as described above, the following excellent property values were obtained.

$W_{17/50}$=0.49 W/kg

Lamination factor=98.8%

EXAMPLE 5

A continuously cast silicon steel slab composed of 0.079% C, 3.46% Si, 0.086% Mn, 0.022% Se, 0.023% Sb, 0.026% Al, 0.012% Mo, and the rest substantially being Fe, was heated at 1,350° C. for 3 hours, and then was hot-rolled to produce a hot-rolled sheet having a thickness of 2.2 mm. Then, cold rolling was performed twice interposed with intermediate annealing to produce a final cold-rolled sheet having a thickness of 0.23 mm.

After etching resist ink, which had an alkyd resin as a major constituent, was applied onto the surface of the final cold-rolled sheet by gravure offset lithography such that the non-applied sections remain linearly with a width of 200 μm spaced by 4 mm substantially perpendicular to the rolling direction, baking was performed at 200° C. for approximately 20 seconds. The resist thickness was 2 μm. By performing electrolytic etching onto the steel sheet applied with the etching resist, linear grooves having a width of 200 μm and a depth of 20 μm were formed, and the resist was removed by dipping in an organic solvent. The electrolytic etching was performed in an NaCl electrolytic solution with an electric current density of 10 $A/m^2$ and a treating time of 20 seconds.

After performing decarburization and primary recrystallization annealing in an atmosphere of wet hydrogen at 845° C., an annealing separator slurry composed of MgO (25%), $Al_2O_3$ (70%), $CaSiO_3$ (3%), and $SnO_2$ (2%) was applied onto the surface of the steel sheet. Annealing was performed at 850° C. for 15 hours, and secondary recrystallized grains highly integrated in the Goss orientation were developed while raising a temperature to 1,100° C. at a rate of 10° C./h, and then purification treatment was performed in an atmosphere of dry hydrogen at 1,200° C.

Next, pickling treatment was performed in 30% HCL (80%) to remove oxides on the surface of the steel sheet, a coil was divided into two. With respect to the first half of the coil, two layers including a $Si_3N_4$ film (0.3 μm thick) and an AlN film (0.2 μm thick) were deposited by magnetron sputtering. With respect to the second half of the coil, two layers, i.e., a low purity AlN layer (approximately 1.5% of Fe, Ti, and Al included in the ceramic coating as impurities; 0.3 μm thick) as a first layer and a high purity AlN layer (AlN purity in the ceramic coating: 99% or more) as a second layer, were deposited by magnetron sputtering.

As the result of measuring iron loss and lamination factor of the product obtained as described above, the following excellent property values were obtained.

| | |
|---|---|
| First half of the coil | $W_{17/50}$ = 0.59 W/kg<br>Lamination factor = 99.1% |
| Second half of the coil | $W_{17/50}$ = 0.58 W/kg<br>Lamination factor = 99.2% |

EXAMPLE 6

A continuously cast silicon steel slab composed of 0.072 wt % C., 3.35 wt % Si, 0.072 wt % Mn, 0.020 wt % Se, 0.025 wt % Sb, 0.020 wt % Al, 0.072 wt % N, 0.012 wt % Mo, and the rest substantially being Fe, was heat treated at 1,350° C. for 4 hours, and then was hot-rolled to produce a hot-rolled sheet having a thickness of 2.2 mm. After normalizing annealing was performed at 1,020° C., cold rolling was performed twice interposed with intermediate annealing at 1,050° C. to produce a final cold-rolled sheet having a thickness of 0.23 mm.

After performing decarburization and primary recrystallization annealing in an atmosphere of wet hydrogen at 840° C., an annealing separator slurry composed of MgO (20%), $Al_2O_3$ (70%), and $CaSiO_3$ (10%) was applied onto the surface of the steel sheet. Annealing was performed at 850° C. for 15 hours, and secondary recrystallized grains highly integrated in the Goss orientation were developed while raising a temperature from 850° C. to 1,180° C. at a rate of 12° C./h, and then purification treatment was performed in an atmosphere of dry hydrogen at 1,220° C.

The oxide film on the surface of the silicon steel sheet obtained as described above was removed, and smoothing treatment was performed by chemical polishing.

Then, an $Si_3N_4$ ceramic coating was deposited onto the silicon steel sheet by magnetron sputtering at a thickness of 0.6 μm. The target used for the plasma coating was formed in the following manner.

A ferrosilicon material (100 kg) was molten in a vacuum melting furnace, and cut into dimensions of 10 mm×127 mm×476 mm, followed by bonding treatment. In the bonding treatment, one side of an Si substrate was subjected to Cu plating, and was bonded onto a Cu substrate (the back side of the water cooled Cu substrate enabling a magnet to be mounted) by using In so as to be used as a ferrosilicon target. The ferrosilicon target was composed of 91.1% Si, 8.2% Fe, 0.09% Al, 0.08% Ti, and other trace elements. The ferrosilicon target was inserted into a magnetron sputtering system, and a thin $Si_3N_4$ coating was formed onto the silicon steel sheet at a thickness of approximately 0.6 μm by magnetron sputtering with an operating power of voltage at 400 V and current at 50 A. Nitrides of Fe, Al, and Ti, as impurities, were detected in the interface between the silicon steel sheet and the ceramic coating, and thus good adhesion was confirmed. Also, it was confirmed that the components of $Si_3N_4$ had been altered in the thickness direction, and that the coefficient of thermal expansion had become lower toward the outer layer. The product obtained as described above had the following magnetic properties and adhesion.

(1) When smoothing treatment was performed

| | |
|---|---|
| Magnetic properties | $B_8$: 1.95 T<br>$W_{17/50}$: 0.58 W/kg |

Adhesion Good. No separation was observed even if 180° bending was performed on a round bar having a diameter of 10 mm.

(2) When pickling treatment was performed

| | |
|---|---|
| Magnetic properties | $B_8$: 1.94 T<br>$W_{17/50}$: 0.63 W/kg |

Adhesion Good. No separation was observed even if 180° bending was performed on a round bar having a diameter of 10 mm.

EXAMPLE 7

A continuously cast silicon steel slab composed of 0.044 wt % C, 3.39 wt % Si, 0.073 wt % Mn, 0.020 wt % Se, 0.025 wt % Sb, 0.012% Mo, and the rest substantially being Fe, was heat treated at 1,340° C. for 3 hours, and then was hot-rolled to produce a hot-rolled sheet having a thickness of 2.4 mm. After normalizing annealing was performed at 900° C., cold rolling was performed twice interposed with intermediate annealing at 950° C. to produce a final cold-rolled sheet having a thickness of 0.23 mm.

After etching resist ink, which had an alkyd resin as a major constituent, was applied onto the surface of the final cold-rolled sheet by gravure offset lithography such that the non-applied sections remain linearly with a width of 200 μm in the direction substantially perpendicular to the rolling direction, spaced by 4 mm in the rolling direction, baking was performed at 200° C. for approximately 20 seconds. The resist thickness was 2 μm. By performing electrolytic etching onto the steel sheet applied with the etching resist, linear grooves having a width of 200 μm and a depth of 20 μm were formed, and the resist was removed by dipping in an organic solvent. The electrolytic etching was performed in an NaCl electrolytic solution with an electric current density of 10 $A/dm^3$ and a treating time of 20 seconds.

After performing decarburization and primary recrystallization annealing in an atmosphere of wet hydrogen at 840° C., an annealing separator slurry composed of MgO (25%), $Al_2O_3$ (70%), and $CaSiO_3$ (5%) was applied onto the surface of the steel sheet. After secondary recrystallized grains highly integrated in the Goss orientation were developed by isothermal annealing at 850° C. for 50 hours, purification treatment was performed in an atmosphere of dry hydrogen at 1,200° C.

The oxide film on the surface of the silicon steel sheet obtained as described above was removed, and the surface of the grain-oriented silicon steel sheet was smoothed by chemical polishing. Then, Si was deposited thereon at a thickness of 0.05 μm by magnetron sputtering, and after treatment in a mixed atmosphere of $H_2$ (50%) +$N_2$ (50%) at 1,000° C. for 15 minutes, an insulating tensile coating (approximately 2 μm thick) essentially consisting of colloidal silica and a phosphate was formed onto the surface of the steel sheet. Baking treatment was performed at 800° C.

The product obtained as described above had the following magnetic properties and adhesion.

| | |
|---|---|
| Magnetic properties | $B_8$: 1.88 T<br>$W_{17/50}$: 0.66 W/kg |

Adhesion Good. No separation was observed even if 180° bending was performed on a round bar having a diameter of 20 mm.

Also, when a nitride and oxide layer containing Si was formed significantly thinly onto the surface of the steel sheet after pickling treatment without chemical polishing in the same manner as that described above, and an insulating tensile coating of a phosphate was formed, the product obtained had the following magnetic properties and adhesion.

| | |
|---|---|
| Magnetic properties | $B_8$: 1.88 T<br>$W_{17/50}$: 0.68 W/kg |

Adhesion Good. No separation was observed even if 180° bending was performed on a round bar having a diameter of 20 mm Industrial Applicability In accordance with the present invention, an ultra-low iron loss grain-oriented silicon steel sheet, which has significantly superior iron loss and lamination factor in comparison with the conventional material, can be obtained

TABLE 1

| | Coating Composition (Thickness μm) | Sheet Thickness (mm) | $W_{17/50}$ (W/kg) | $B_8$ (T) | Lamination factor (%) | Remarks |
|---|---|---|---|---|---|---|
| 1) | TiN + $Si_3N_4$ (0.2) (0.5) | 0.23 | 0.55 | 1.94 | 99.0 | Present Invention |
| 2) | TiN (1.0) | 0.23 | 0.62 | 1.94 | 97.5 | Comparative Example |
| 3) | Current Silicon Steel Sheet | 0.23 | 0.80 | 1.93 | 96.5 | Comparative Example |

TABLE 2

| | Treating Condition | $B_8$ (T) | $W_{17/50}$ (W/kg) | Lamination factor (%) | Remarks |
|---|---|---|---|---|---|
| 1) | TiN (0.2 μm) + $Si_3N_4$ (0.5 μm) coated on steel sheet with linear grooves | 1.90 | 0.45 | 98.9 | Present Invention |
| 2) | TiN (0.2 μm) + $Si_3N_4$ (0.5 μm) coated on steel sheet without grooves | 1.94 | 0.56 | 98.8 | Present Invention |
| 3) | TiN (1.0 μm) coated on steel sheet without grooves | 1.95 | 0.60 | 97.5 | Comparative Example |

TABLE 3

| No. | Inner Layer + Outer Layer (Thickness μm) | $W_{17/50}$ (W/kg) | $B_8$ (T) | Lamination factor (%) | Remarks |
|---|---|---|---|---|---|
| 1 | TiN + $Si_3N_4$ (0.3 + 0.5) | 0.53 | 1.93 | 99.1 | Present Invention |
| 2 | AlN + BN (0.2 + 0.4) | 0.56 | 1.94 | 98.1 | Present Invention |
| 3 | HfN + $Si_3N_4$ (0.1 + 0.7) | 0.58 | 1.94 | 98.7 | Present Invention |
| 4 | VN + SiC (0.3 + 0.4) | 0.55 | 1.95 | 98.6 | Present Invention |
| 5 | HfN + $Si_3N_4$ (0.1 + 0.7) | 0.58 | 1.95 | 98.9 | Present Invention |
| 6 | ZrC + $Si_3N_4$ (0.2 + 0.6) | 0.59 | 1.95 | 99.0 | Present Invention |
| 7 | TiC + SiC (0.3 + 0.5) | 0.60 | 1.94 | 98.8 | Present Invention |
| 8 | NiC + BN (0.1 + 0.4) | 0.52 | 1.94 | 99.2 | Present Invention |
| 9 | CrC + AlN (0.3 + 0.7) | 0.56 | 1.95 | 98.7 | Present Invention |
| 10 | TiN single layer (1.0) | 0.63 | 1.95 | 97.5 | Comparative Example |
| 11 | Current Silicon Steel Sheet | 0.81 | 1.94 | 96.5 | Comparative Example |

TABLE 4

| No. | Groove Formation Process | Inner Layer + Outer Layer (Thickness μm) | $W_{17/50}$ (W/kg) | $B_8$ (T) | Lamination factor (%) | Remarks |
|---|---|---|---|---|---|---|
| 1 | (1) | TiN + $Si_3N_4$ (0.2 + 0.5) | 0.43 | 1.91 | 98.9 | Present Invention |
| 2 | (3) | AlN + $Si_3N_4$ (0.3 + 0.5) | 0.47 | 1.89 | 98.9 | Present Invention |
| 3 | (2) | HfN + BN (0.2 + 0.6) | 0.49 | 1.89 | 98.6 | Present Invention |
| 4 | (1) | TiC + $Si_3N_4$ (0.2 + 0.5) | 0.49 | 1.90 | 99.0 | Present Invention |
| 5 | (1) | NiC + AlN (0.2 + 0.6) | 0.47 | 1.89 | 98.8 | Present Invention |
| 6 | (1) | CrN + $Si_3N_4$ (0.1 + 0.5) | 0.49 | 1.89 | 98.7 | Present Invention |
| 7 | (3) | VC + SiC (0.2 + 0.4) | 0.46 | 1.90 | 99.3 | Present Invention |
| 8 | (2) | ZrN + AlN (0.3 + 0.6) | 0.44 | 1.91 | 99.2 | Present Invention |
| 9 | (1) | MnN + $Si_3N_4$ (0.2 + 0.5) | 0.45 | 1.90 | 99.0 | Present Invention |
| 10 | (1) | TaC + AlN (0.1 + 0.6) | 0.49 | 1.90 | 98.9 | Present Invention |
| 11 | — | TiN single layer (1.0) | 0.57 | 1.94 | 97.4 | Comparative Example |
| 12 | — | Current Silicon Steel Sheet | 0.78 | 1.93 | 96.5 | Comparative Example |

What is claimed is:

1. An ultra-low iron loss grain-oriented silicon steel sheet comprising a grain-oriented silicon steel sheet having a ceramic tensile coating, wherein said ceramic tensile coating comprises at least two portions, one being an outer portion comprising a ceramic tensile coating formed on an outer surface thereof, and one being an inner portion comprising a ceramic tensile coating portion which is positioned between said outer portion and said steel surface, wherein said portions are selected from the group consisting of a nitride, carbide and combination thereof; and wherein said outer tensile coating portion has a coefficient of thermal expansion that is lower than the coefficient of thermal expansion of said inner tensile coating portion; and wherein said outer portion of said ceramic tensile coating is an insulating coating; and wherein said grain oriented silicon steel sheet has a thickness of about 0.05 to 0.5 mm.

2. An ultra-low iron loss grain-oriented silicon steel sheet according to claim 1, wherein said ceramic tensile coating comprises at least two different but connected portions.

3. An ultra-low iron loss grain-oriented silicon steel sheet according to claim 1, wherein said steel sheet surface is finishing-annealed and is grooved.

4. An ultra-low iron loss grain-oriented silicon steel sheet according to claim 3, wherein said finishing-annealed surface of said grain-oriented silicon steel comprises a plurality of substantially linear groove regions having a width of about 50 to 500 μm and a depth of about 0.1 to 50 μm, said groove regions being spaced at about 2 to 10 mm in a direction substantially perpendicular to the rolling direction of said sheet.

5. An ultra-low iron loss grain-oriented silicon steel sheet according to claim 1, wherein said surface of said grain-oriented silicon steel sheet is finishing-annealed and smoothed and comprises linear groove regions having a width of about 50 to 500 μm and a depth of about 0.1 to 50 μm, and said groove regions being spaced at 2 to 10 mm in the direction substantially perpendicular to the rolling direction of said steel.

6. An ultra-low iron loss grain-oriented silicon steel sheet according to claim 1, wherein said steel has a lamination factor of 98% or more.

7. An ultra-low iron loss grain-oriented silicon steel sheet according to claim 1, wherein at least one of said inner and outer tensile coating portions is a layer.

8. An ultra-low iron loss grain-oriented silicon steel sheet according to claim 1, wherein both of said inner and outer tensile coating portions are layers.

9. An ultra-low iron loss grain-oriented silicon steel sheet according to claim 1, wherein at least one of said tensile coating portions comprises TiN.

10. An ultra-low iron loss grain-oriented silicon steel sheet according to claim 1, wherein at least one of said tensile coating portions comprises $Si_3N_4$.

11. An ultra-low iron loss grain-oriented silicon steel sheet according to claim 1, wherein at least one of said tensile coating portions comprises SiC.

12. The ultra-low iron loss grain-oriented silicon steel sheet defined in claim 1, said sheet having a $W_{17/50}$ loss<0.60 w/kg.

13. The ultra-low grain-oriented silicon steel defined in claim 1, wherein said inner ceramic coating portion is directly secured to the steel surface of said sheet.

14. The ultra-low iron loss grain-oriented silicon steel sheet defined in claim 1, wherein each said coating portion comprises a nitride, carbide or combination thereof of an element selected from the group consisting of Si, Mn, Cr, Ni, Mo, W, V, Ti, Nb, Ta, Hf, Al, Cu, Zr and B.

15. The ultra-low iron loss grain-oriented silicon steel sheet defined in claim 1, wherein the total thickness of said ceramic coating is 0.3–2 μm.

16. The ultra-low loss grain-oriented silicon steel sheet defined in claim 1, surface of said sheet being substantially free of oxide coating.

17. The ultra-low iron loss grain-oriented silicon steel sheet defined in claim 1, the inner ceramic layer being in direct adhesive contact with the steel sheet surface.

18. A method of making a ultra-low iron loss grain-oriented silicon steel sheet having superior iron loss and lamination factors, comprising:

forming a ceramic tensile coating, wherein said ceramic tensile coating comprises at least two portions, one being an outer portion comprising a ceramic tensile coating formed on an outer surface thereof, and one being an inner portion comprising a ceramic tensile coating portion which is positioned between said outer portion and said steel surface, wherein said portions are selected from the group consisting of a nitride, carbide and combination thereof; and wherein said outer tensile coating portion has a coefficient of thermal expansion that is lower than the coefficient of thermal expansion of said inner tensile coating portion; and wherein said outer portion of said ceramic tensile coating is an insulating coating; and wherein said grain oriented silicon steel sheet has a thickness of about 0.05 to 0.5 mm.

* * * * *

UNITED STATES PATENT AND TRADEMARK OFFICE

CERTIFICATE OF CORRECTION

PATENT NO. : 6,280,862 B1
DATED : August 28, 2001
INVENTOR(S) : Yukio Inokuti

It is certified that error appears in the above-identified patent and that said Letters Patent is hereby corrected as shown below:

Column 12,
Line 21, please change "1,3400°" to -- 1,340° --.

Signed and Sealed this

Twelfth Day of March, 2002

*Attest:*

JAMES E. ROGAN

*Attesting Officer*

*Director of the United States Patent and Trademark Office*